(12) United States Patent
Morimitsu

(10) Patent No.: US 6,897,907 B2
(45) Date of Patent: May 24, 2005

(54) LIQUID CRYSTAL DISPLAY DEVICE AND METHOD OF MANUFACTURING THE SAME

(75) Inventor: Atsushi Morimitsu, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 6 days.

(21) Appl. No.: 10/301,615

(22) Filed: Nov. 22, 2002

(65) Prior Publication Data

US 2003/0122979 A1 Jul. 3, 2003

(30) Foreign Application Priority Data

Nov. 26, 2001 (JP) ...................................... 2001-360149

(51) Int. Cl.[7] ............................................ G02F 1/136
(52) U.S. Cl. ........................................ 349/42; 349/43
(58) Field of Search ............................. 349/43, 42, 149

(56) References Cited

U.S. PATENT DOCUMENTS 6,469,767 B2 * 10/2002 Onishi ........................ 349/149

FOREIGN PATENT DOCUMENTS

JP          10256365      *  9/1998    ......... H01L/21/768

* cited by examiner

*Primary Examiner*—Tarifur R. Chowdhury
*Assistant Examiner*—Jeanne Andrea Di Grazio
(74) *Attorney, Agent, or Firm*—Oblon, Spivak, McClelland, Maier & Neustadt, P.C.

(57) ABSTRACT

A liquid crystal display device including electric power supply paths to supply electric power from connecting pads on a circuit array substrate to a counter electrode of a counter substrate. The liquid crystal display device substantially prevents the electric power supply paths from possible break-down thereby improving the quality of the liquid crystal display device.

4 Claims, 7 Drawing Sheets

LIQUID CRYSTAL DISPLAY DEVICE AND METHOD OF MANUFACTURING THE SAME

FIELD OF THE INVENTION

This invention relates to a liquid crystal display device and a method of manufacturing the same. In particular, it is directed to a liquid crystal display device with an electric power supply path to connect a first conductive pattern disposed on a first substrate to a second conductive pattern disposed on a second substrate.

DISCUSSION OF THE BACKGROUND

Various types of flat panel display devices have been developed as replacement of cathode-ray tubes (CRT). Since among others liquid crystal display devices have such advantageous features as light weight, thin thickness, low electric power consumption, etc., the liquid crystal display devices have been widely noticed. In addition, an active matrix type liquid crystal display device with switches connected electrically to pixel electrodes, respectively, has become a main stream of the liquid crystal display device because no substantial cross-talk takes place between adjacent pixels so that it realizes an excellent display quality.

The following description is directed to an optically transparent, active matrix liquid type crystal display device, for example, which includes thin film transistors as switching elements.

Such an active matrix liquid crystal display device includes an electronic circuit array substrate and its counter substrate between which a liquid crystal layer is held. Alignment layers are provided on the inner walls of the substrates to align molecular orientation of the liquid crystal. The array substrate further includes an insulation layer made of glass or quartz, a plurality of signal and scanning lines disposed in matrix on the insulation layer, and a plurality of pixel electrodes made of a transparent material, such as indium-tin-oxide (ITO), and disposed on regions defined by the matrix. Thin film transistors (TFTs) are provided adjacent to the cross points in the matrix as switching elements to control the pixel electrodes. Gate and drain electrodes of the TFTs are electrically connected to scanning and signal lines, respectively, while source electrodes of the TFTs are electrically connected to the pixel electrodes.

The counter substrate is optically transparent so that it includes a transparent insulation layer made of glass, and an ITO counter electrode disposed on such transparent insulation layer. A color filter layer is further provided on the counter substrate for a color image display.

The array substrate extends outward, to define a plate-like outer peripheral portion of the liquid crystal display device, as an electrically connecting portion to receive connecting pads connected to terminals of flexible printed circuits, driver integrated circuits (IC), etc. through isotropically conductive layers. The inner peripheral edge of the counter substrate and the opposite inner edge of the array substrate are sealed with sealant to prevent the liquid crystal from leaking.

The connecting pads include electric power supply lines to supply electric power to the counter electrode. The electric power supply lines are connected to the counter electrode through electric power supply lines and terminals disposed on the array substrate, and conducting materials provided between the substrates (see, for instance, Japanese Patent Publication Tokkai Hei 10-8326).

In this type of the liquid crystal display device, aluminum (Al) or its alloy is used for signal lines of such display technologies as high definition display functions and large display sizes. In the case, however, where the connecting pads are made of such a metal material, the pads partially move by mechanical scratching or rubbing (scrubbing), because the hardness and melting point of aluminum or its alloy are relatively low. As a result, short circuits take place between the adjacent pads.

In order to overcome such short circuits, signal line pads can be made of the same materials (such as molybdenum (Mo) or molybdenum wolfram (MoW), which have much higher hardness and higher temperature melting points) and made at the same time as the scanning lines and scanning line pads. In this case, the signal line pads or their extending portions are connected to the signal lines through electrically conductive materials, which are provided in contact holes located at the peripheral edge and in either the sealing portion or the portion adjacent to it.

Further, the electric power supply line pads are also made of molybdenum system metals and connected to terminals of the electric power supply lines though the conductive materials in the contact holes.

Meanwhile, the manufacturing cost of the array substrate is quite high the cost as a part of the cost of the liquid crystal display device and, in particular, the manufacturing cost of the TFTs is significant as a part of the cost as a part of the cost of the array substrate.

Thus, attempts at cost reduction of the TFTs and array substrate have been made by means of having a lower number of patterning processes, i.e., a lesser number of photo-masks to shorten the manufacturing process as a whole.

Japanese Patent Application Tokugan Hei 8-260572 discloses that the pixel electrodes are disposed on the top layer thereby carry out the patterning process of the signal lines, source and drain electrodes, and semiconductor coating layer at the same time and with the same photo-mask pattern. After that patterning process, the contact holes connecting the source electrodes to the pixel electrodes are made at the same time as the peripheral contact holes exposing connecting terminals of the signal and scanning lines.

In detail, the peripheral contact holes have first and second contact holes exposing first and second conductive layers, respectively, and small size conductive connecting patterns bridging the first and second holes. The conductive connecting patterns are made at the same time as the pixel electrodes.

A conventional liquid crystal display device is shown in FIGS. 6 and 7. FIG. 6 is a schematic plan view of a part (corner portion) of the liquid crystal display device. FIG. 7 is a schematic and sectional view of an edge of the liquid crystal display device cut along the line VII—VII as shown in FIG. 6.

A first electric power supply terminal 34' disposed on a circuit array substrate 10' is provided opposite to a second electric power supply terminal 21 disposed on a counter substrate 20, in a predetermined inside region surrounded by sealant 62. The terminals 34' and 21 are electrically connected by an electrically conductive material 61 made of an electrically conductive paste. The second electric power supply terminal 21 is an extending portion of a counter electrode. The first electric power supply terminal 34' extends an electric power supply line 34'*a*, which also extends toward an electric power supply line pad 13 in a plate-like connecting portion. The end of the electric power supply line 34'a is overlapped with, or disposed close to, a connecting wide-width portion 13a, which is a portion extending from the electric power supply line pad 13 to an inside portion of the substrate. An ITO film 54 is connected to the wide-width portion 13a and the edge of the power supply line 34'a through contact holes 45 and 46, i.e., the power supply fine 34'a and the pad 13 are connected through the ITO film 54.

In such a conventional liquid crystal display device, since the ITO film 54 electrically connects the power supply line 34'a to the pad 13, if it is broken, electric power is not supplied to the counter electrode, thereby causing a poor image display. In the case where edge surfaces of insulation layers 15 and 4 (defining contact holes 44 and 45, respectively) become steep in angle (acute angles), breaking-down of the ITO film 54 may occur.

Even though the power supply line 34'a is directly connected to the pad 13 or the wide-width portion 13a, through electrically conductive materials of the one contact hole provided in the insulation layer 15, the breaking-down of the electric power supply line 34'a may occur due to dust, etc., during the patterning process.

SUMMARY OF THE INVENTION

It is accordingly an object of this invention to overcome such a technical problem as set forth above.

Another object of the invention is to provide a liquid crystal display device and a method of manufacturing the same, which prevents the breaking-down of electric power supply lines supplying electric power from connecting pads on a circuit array substrate to a counter electrode on a counter substrate from interrupting the supply of power.

A further object of the invention is to improve the reliability of a liquid crystal display device and to provide a method of manufacturing the same.

A liquid crystal display device of the present invention has a circuit array substrate, a counter substrate provided opposite to the array substrate, a liquid crystal layer held between the array and counter substrates, and sealant to seal the liquid crystal layer at the periphery of the substrates.

The array substrate includes pixel electrodes and switching elements disposed in matrix, signal and scanning lines crossed substantially in right angles, connecting pads provided along at least one edge of the array substrate, electric power supply lines, a first power supply terminal extending from an edge of the power supply lines, and contact holes provided to electrically connect another edge of the power supply lines to the connecting pads.

The counter electrode includes a counter electrode provided opposite to regions of the pixel electrodes and a second electric power supply terminal provided on a part of the counter electrode or its extending portion.

Electrically conductive materials are further provided between the array and counter substrate to electrically connect the first power supply terminals to the second power supply terminals. The array substrate further includes redundant electric power supply lines extending from the one edge of the connecting pads, and contact holes provided to connect the redundant electric power supply lines or their extending portions to the first power supply terminals.

The liquid crystal display device of the present invention prevents the breaking-down of all of the power supply lines or paths supplying electric power from the connecting pads of the array substrate to the counter electrode of the counter substrate. As a result, its quality has been significantly improved.

BRIEF DESCRIPTION OF THE DRAWINGS

A more complete appreciation of the invention and many of the attendant advantages thereof will be readily obtained as the same becomes better understood by reference to the following detailed description, and when considered in connection with the accompanying drawings, wherein.

DETAILED DESCRIPTION OF THE INVENTION

Figure 1:
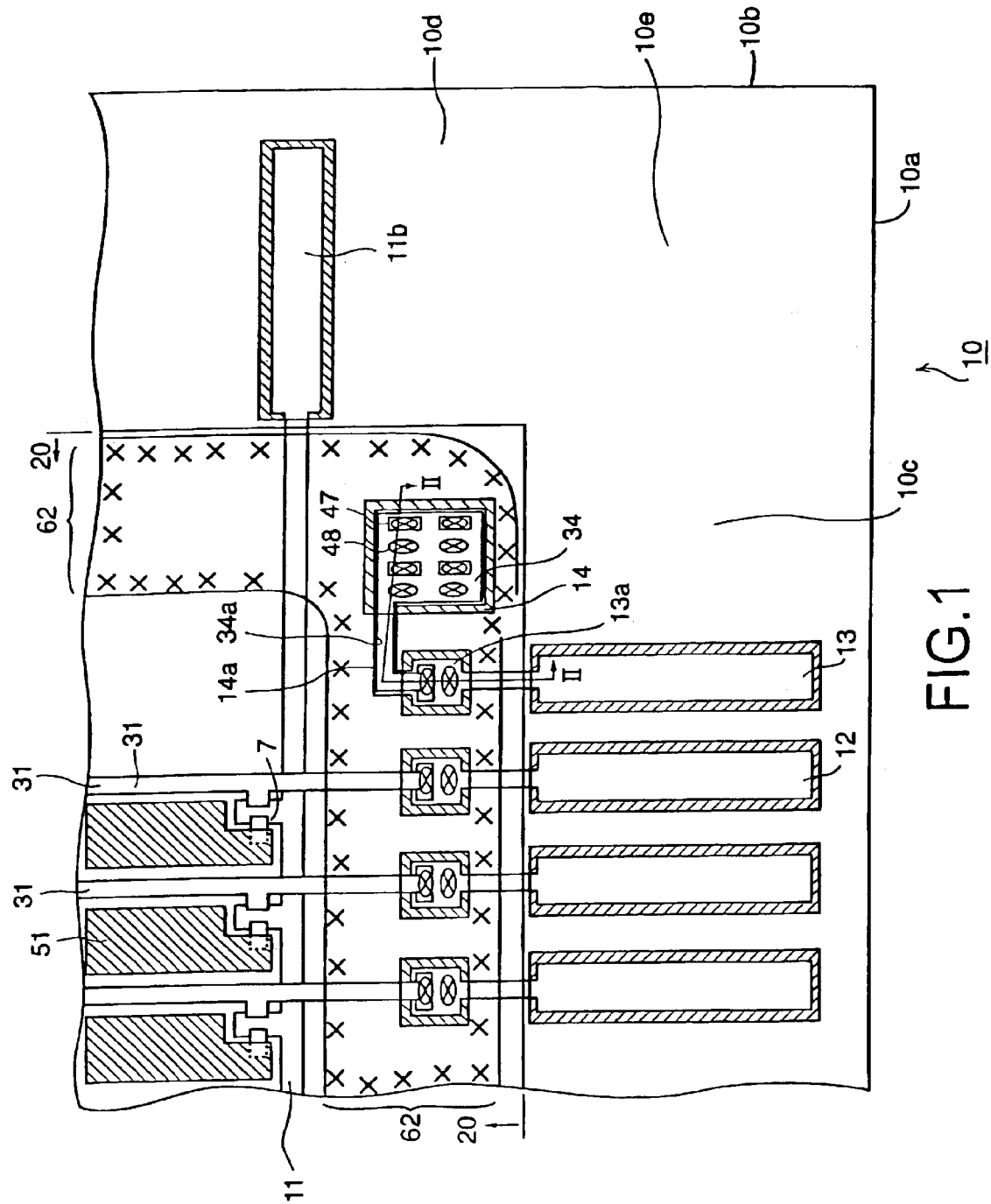
FIG. 1 is a schematic plan view of a part of a liquid crystal display device according to the present invention.
Figure 2:
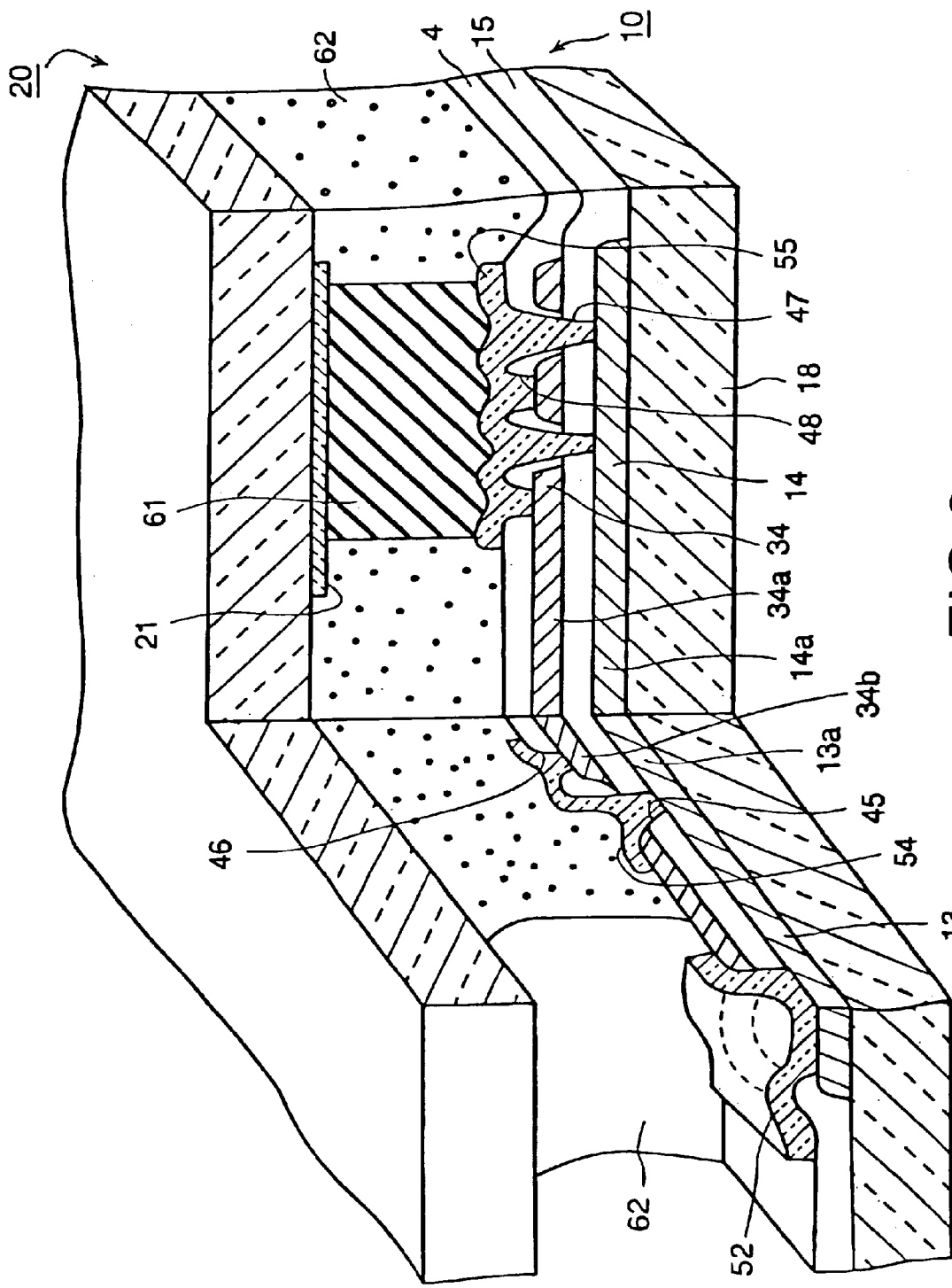
FIG. 2 is a schematic cross-sectional view of the liquid crystal display device cut along II—II line of FIG. 1.

With reference to FIGS. 1 and 2, a preferred embodiment of a liquid crystal display device of the present invention will be hereinafter explained. FIG. 1 is a schematic plan view of a part (comer portion) of the liquid crystal display device. FIG. 2 shows a schematic and sectional view of that part of the liquid crystal display device.

The liquid crystal display device is an active matrix type liquid crystal display device in which a TFT is used for a switching element for each pixel dot. A rectangular circuit array substrate 10 and a counter substrate 20 are provided opposite to each other and are bound with sealant 62 at the peripheral edges of the counter substrate 20 so as to seal a liquid crystal layer. A first electrically conductive layer including scanning lines is made of aluminum or its alloy. A second electrically conductive layer including signal lines 31 (not shown), is made of metal materials such as molybdenum wolfram alloy (MoW), which is higher in hardness and in melting point than aluminum or its alloy.

As shown in FIG. 1, the array substrate 10 has long and short sides 10a and 10b, which extend beyond those of the counter substrate 20 to define plate-like portions 10c and 10d. Along the long side 10a, signal line pads 12 are disposed. Along the short side 10b, scanning line pads 11b are disposed. An electric power supply line pad 13 is disposed in the portion 10c adjacent to a corner 10e defined by the plate-like portions 10c and 10d.

The power supply line pad 13 is electrically connected to an electrically conductive path through which electric power is supplied to the counter electrode of the counter substrate 20. Such an electrically conductive path is provided in an inner region where the sealant 62 is put. As shown, the pad 13 is provided close to the signal line pad 12 so that they define a group of connecting pads, which are connected to tape carrier packages, flexible printed circuit boards, or the like.

The counter electrode on the counter substrate 20 covers entirely an inside region of the sealant 62 and extends into the region of the sealant to define a second electric power supply terminal 21, which is provided in the curved corner of a linear pattern of the sealant 62 as shown in FIG. 1.

Meanwhile, a first electric power supply terminal (transfer electrode) 34 is provided opposite to the second electric power supply terminal 21. The power supply terminal 34 is generally rectangular in shape and is similar in size to the power supply terminal 21. The first power supply terminal 34 is overlapped with an ITO electric power supply terminal film 55 through an interlayer insulation film 4 and contact holes 48 provided in the insulation film 4.

The first electric electric power supply terminal 34 is also provided opposite to an electric power supply terminal terminal base 14, which is vertically apart from, but overlapped with, the power supply terminal 34 through a gate insulation layer 15. The power supply terminal terminal base 14 has substantially the same plan view in terms of shape, place, and size as the power supply terminal 34. Further, the power supply terminal base 14 is connected to the ITO film 55 provided in a plurality of contact holes 47, supplying electric power from the power supply terminal 34 to the power supply terminal base 14.

As shown in FIG. 1, the number of the contact holes 47 and 48 is four, respectfully, in this embodiment, and each hole is made longitudinal in shape along the short side 10b. The contact holes 47 and 48 are disposed side by side along the long side 10a.

The power supply terminal 34 is connected to an electric power supply line 34a, which extends from the inside corner of the power supply terminal 34 to the direction away from the corner 10e of the substrate 10 along the long side 10a. The power supply line 34a curves toward the outside of the substrate 10 (the long side 10a) and has a wide-width portion 34b at the edge, shown in FIG. 2.

The wide-width portion 34b of the power supply lines 34a is overlapped with the edge of a wide-width portion 13a, which extends from the power supply line pad 13 to the inside of the substrate 10. In order to connect the wide-width portion 13a to the wide-width portion 34b, contact holes 45 are made in the insulation layers 15 and 4 while contact holes 46 are also made in the insulation film 4. The contact holes 45 and 46 are filled with an ITO film 54.

The wide-width portion 13a is connected to the power supply terminal base 14 through a redundant electric power supply line 14a made of a first electrically conductive layer. In the present embodiment the redundant power supply line 14a is disposed to substantially overlap with the power supply line 34a.

The redundant power supply line 14a extending from the power supply line pad 13, the power supply terminal base 14 connected to the power supply line 14a, and the ITO film 55 in the contact hole 47 define a redundant power supply path. Thus, an electric power supply path can be made even if the ITO film 54 or the electric power line 34a breaks down.

Next, a manufacturing process of the array substrate will be described with reference to FIGS. 3 through 5.

Figure 3:
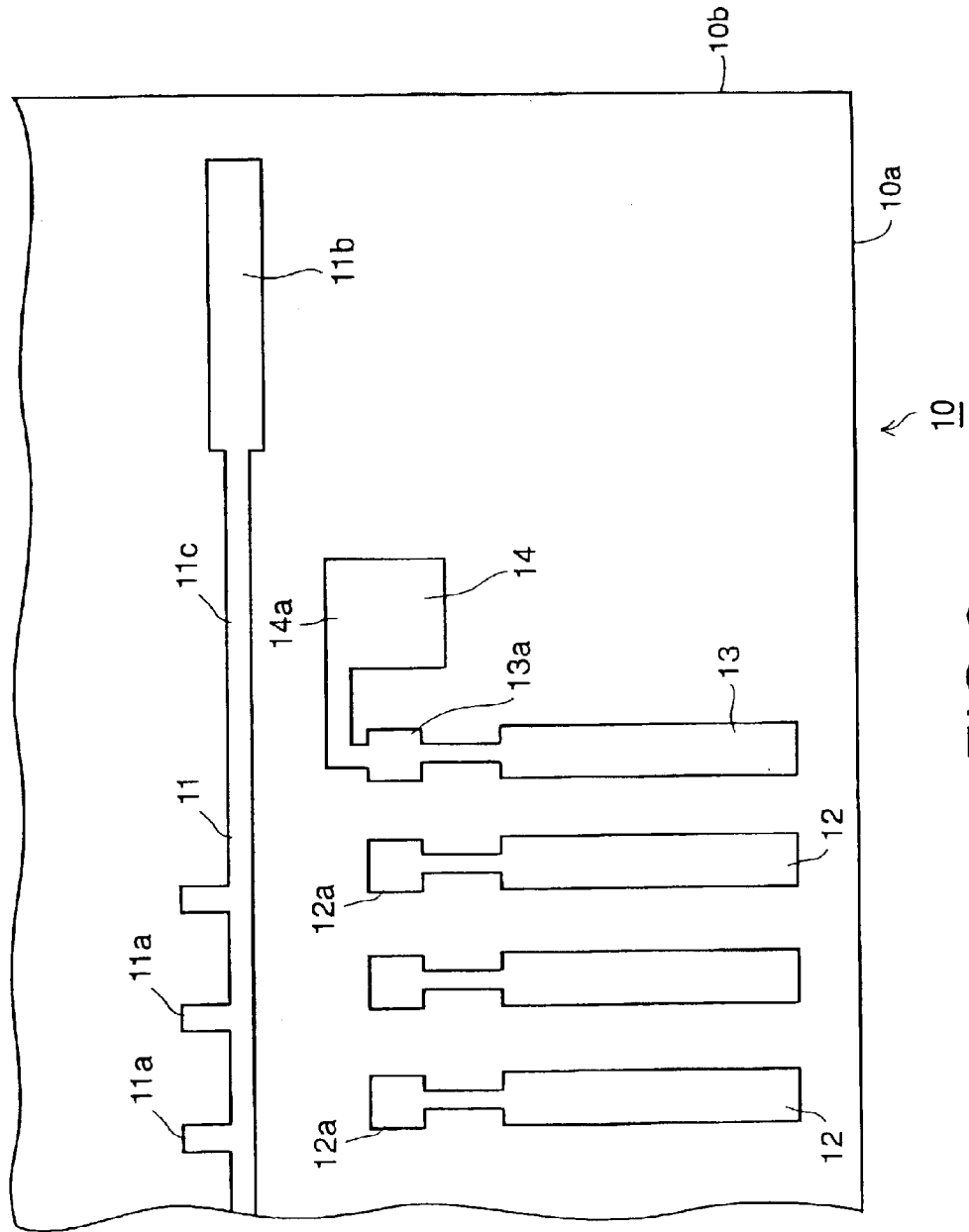
FIG. 3 is a schematic partial plan view of a layout of the liquid crystal display device after a first patterning step in a method of manufacturing a circuit array substrate.

(1) First Patterning Process (FIG. 3)

Molybdenum-wolfram (MoW) is deposited on a glass substrate by applying a metal sputtering method. The deposited MoW is 250 nm in thickness. A patterning step for applying a first mask pattern is used to make 756 scanning lines 11, drawing lines 11c drawn to the short side 10b of the array substrate 10 and pads 11b at the edge thereof. On the long side 10a of the array substrate 10, this step is also used to form signal line pads 12, wide-width portions 12a extending toward the inside of the substrate, electric power supply line pads 13, contacting wide-width portions 13a, an electric power supply terminal base 14, and a redundant electric power supply line 14a connecting the wide-width portion 13a and the power supply terminal base 14. The pixel area is provided with a gate electrode 11a extending from the scanning line 11 corresponding to each pixel dot.

(2) Second Patterning Process

A plasma chemical vapor deposition (plasma CVD) method is applied to deposit a 350 nm oxide silicon layer and 50 nm nitrogen silicon layer in this order on the substrate. Further, the plasma CVD method is also applied to deposit a semiconductor layer of 50 nm amorphous silicon (a-Si:H), as an active semiconductor layer and a 200 nm nitrogen silicon layer, continuously.

Figure 4:
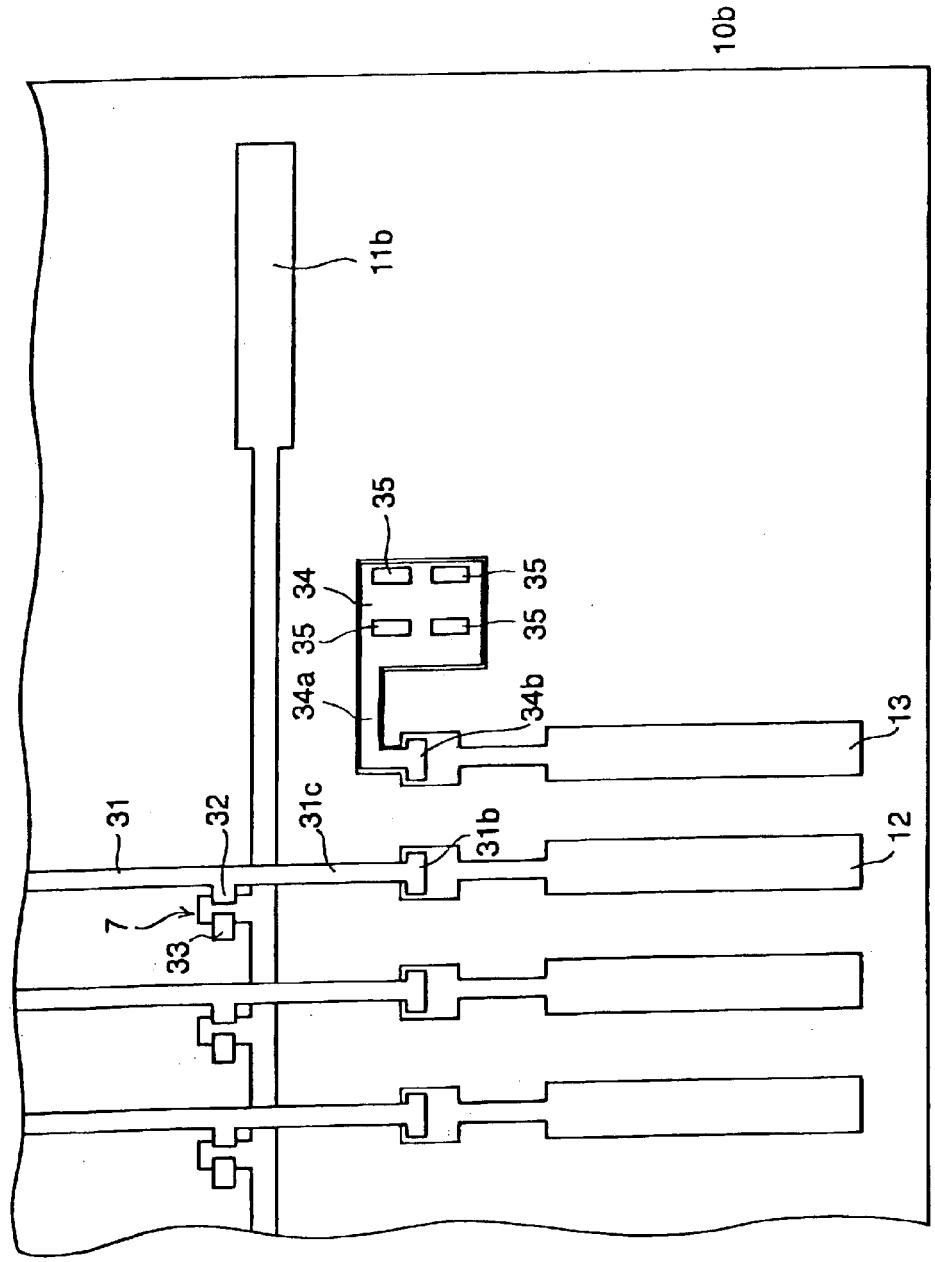
FIG. 4 is a schematic partial plan view of a layout of the liquid crystal display device after a third patterning step in a method of manufacturing a circuit array substrate.

Then, a patterning process is applied to form a nitrogen silicon layer as a channel protection layer at the place corresponding to a channel portion of TFT 7, shown in FIG. 4.

(3) Third Patterning Process (FIG. 4)

The plasma CVD method is also applied to deposit a low electric resistance semiconductor layer of 50 nm phosphorous doped amorphous silicon ($n^+$ a-Si:H) on the semiconductor layer. The low electric resistance semiconductor layer is treated by a hydrogen fluoride solution in preparation for better ohmic contact. After that treatment, a sputtering method is applied to deposit 350 nm of aluminum on the low electric resistance semiconductor layer. Such metal and semiconductor layers as made by means of the process set forth above are then processed by applying a third patterning process, which is collectively carried out with a photo-resist pattern obtained from a third mask pattern used for optical exposure and development.

In this way, the step makes the signal lines 31, drawing lines 31c drawn to the long side 10a of the array substrate 10, and wide-width portions 31b contacting the pads at the edges of the lines 31c. At the same time, the step also forms inter-substrate electric power supply terminals 34 and electric power supply lines extending from the terminals 34. At the edge of the supply lines 34a, wide-width portions 34b are disposed to overlap with the edge portion of the wide-width portions 13a. Four apertures 35 define contact holes at the supply terminal 34.

In the pixel area, drain electrodes 32 extending from the signal lines 31 and source electrodes 33 are made to configure the TFT 7.

Figure 5:
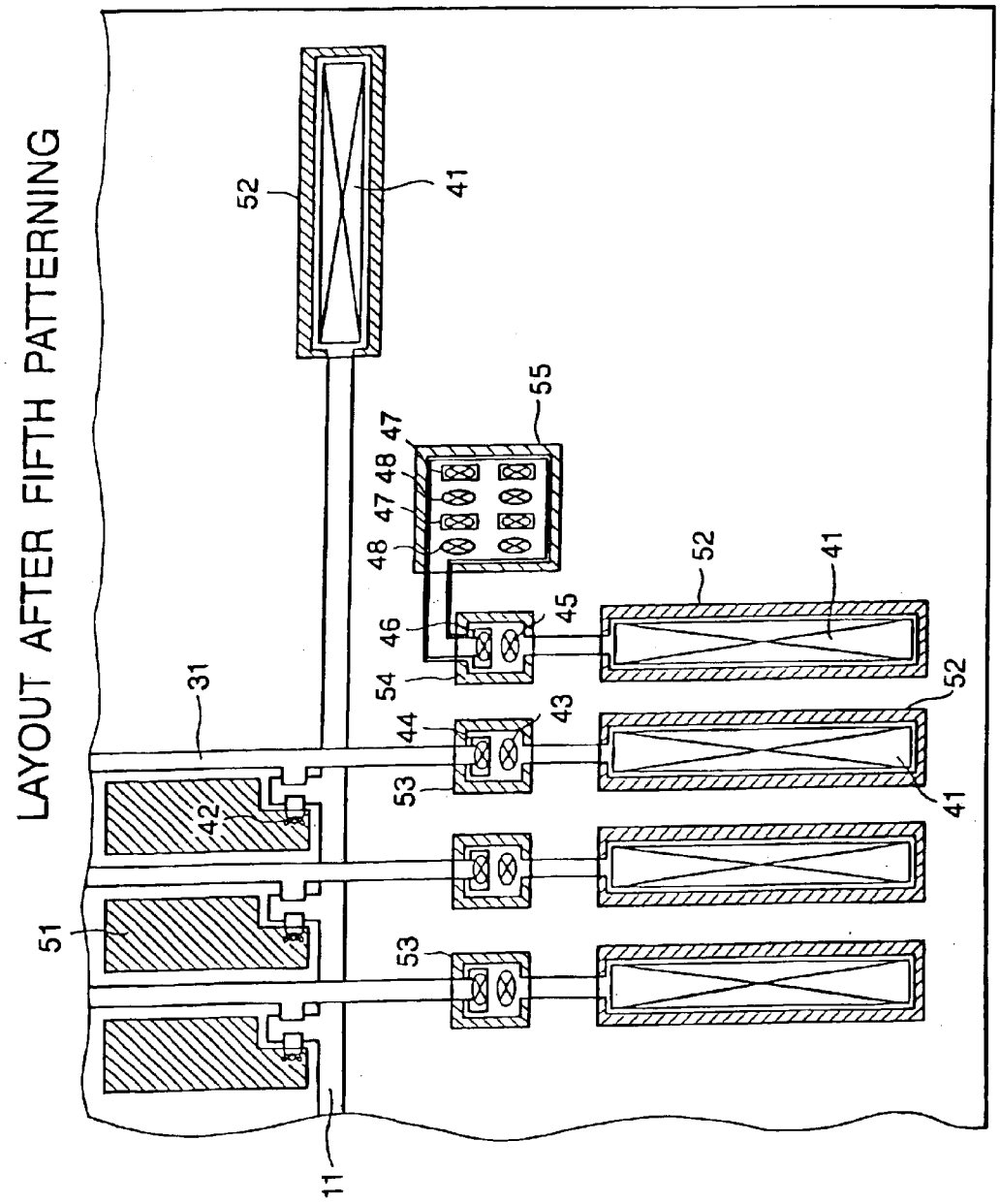
FIG. 5 a schematic partial plan view of a layout of the liquid crystal display device after a fifth patterning step in a method of manufacturing a circuit array substrate.
Figure 6:
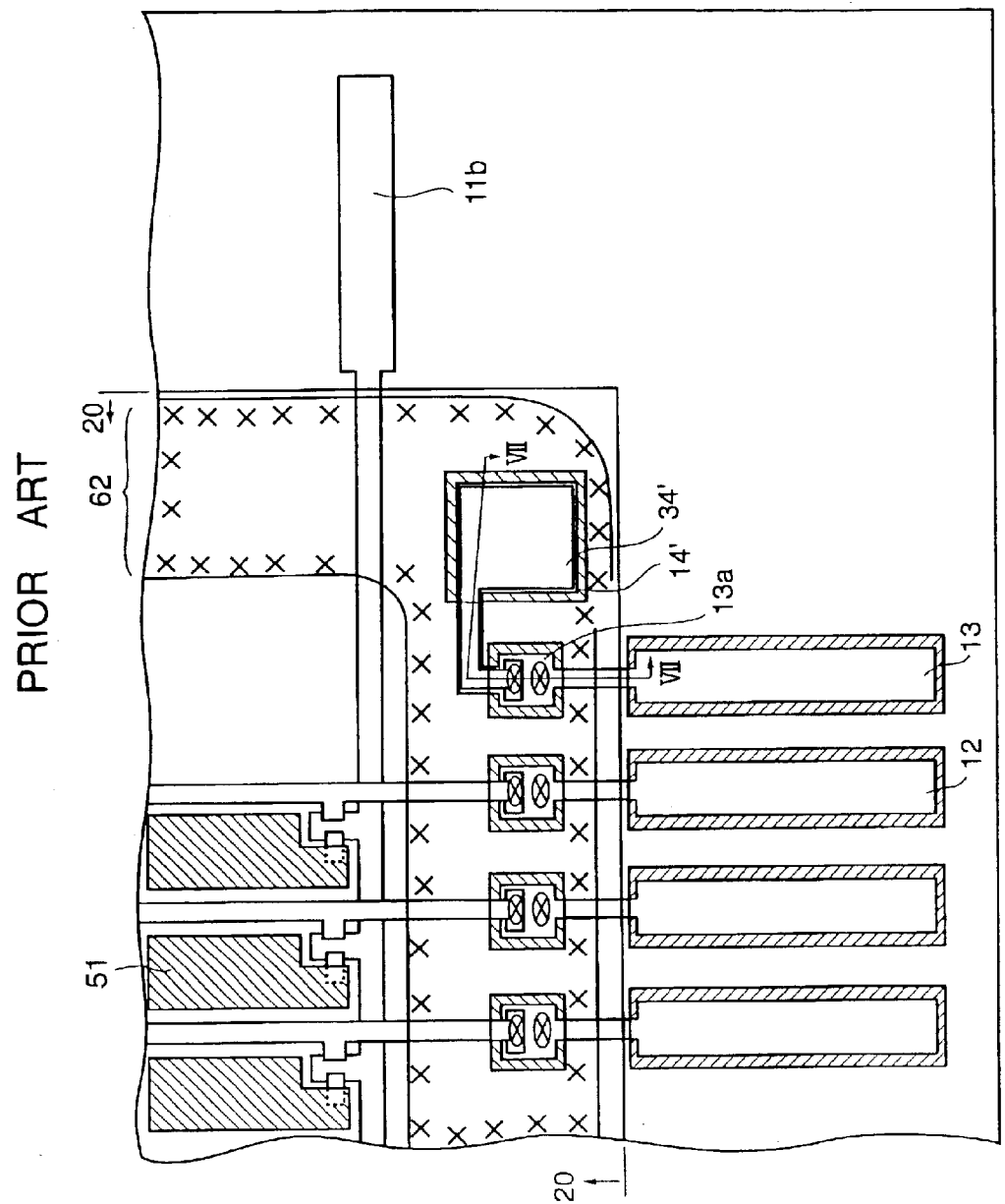
FIG. 6 is a schematic plan view of a part of a prior art liquid crystal display device.
Figure 7:
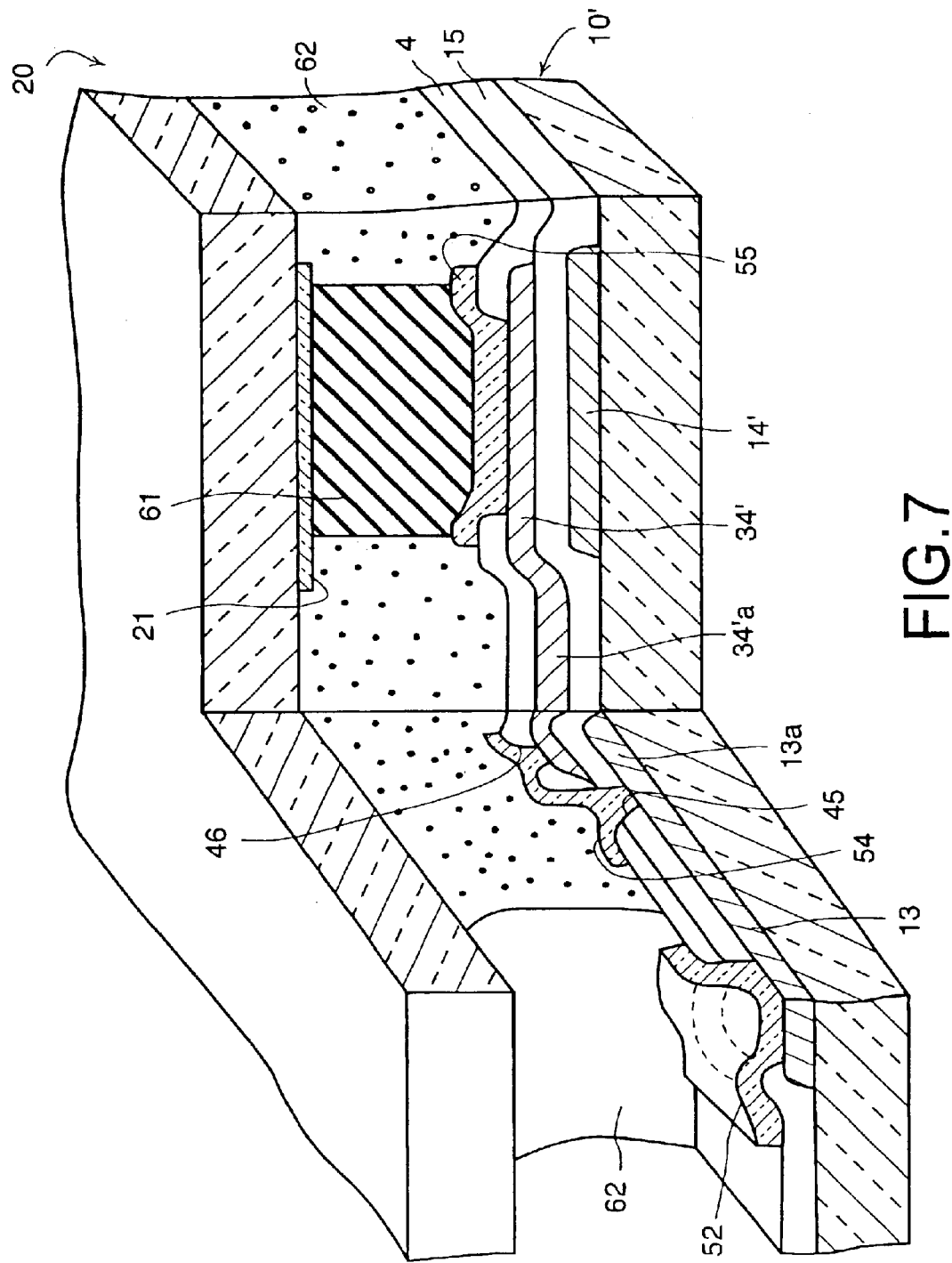
FIG. 7 is a schematic cross-sectional view of the liquid crystal display device cut along VII—VII line of FIG. 6.

(4) Fourth Patterning Process (FIGS. 2 and 5)

An interlayer insulation layer made of 200 nm nitrogen silicon is deposited on the gate insulation layer 15. Then, a contact hole 41 exposing a pad 11b and contact holes 42 between the source and pixel electrodes are formed at the same time.

In addition, contact holes 43 are provided for the signal lines to expose the upper surface of the wide-width portions 12a extending from the signal line pads 12 (FIG. 3), while contact holes 44 are provided for the signal lines to expose the upper surface of the wide-width portions 31b connecting to the signal lines 31. Concurrently, contact holes 45 are formed for electric power supply lines to expose the upper surface of the wide-width portions 13a extending from the electric power supply line pads 13 and contact holes 46 are formed for the electric power supply line to expose the upper surface of the wide-width portions 34b connecting to the power supply lines 34a.

Further, the area of the terminals 34 are provided for supplying electric power between the array and counter substrates. Contact holes 47 are made for the electric power supply terminals 34 to expose the surface of the base 14 for the electric power supply terminals 34 and are provided at the apertures 35 for the contact holes 47. Contact holes 48 are provided for the electric power supply terminals to expose the surface of electric power supply terminals 34.

This patterning process is designed not to expose the edge surface of the second conductive layer pattern made of aluminum. It must prevent etching solution from corroding the aluminum pattern because, in order to make contact holes collectively, a wet etching process is carried out using particularly buffered hydrogen fluoride (BHF) solution which otherwise would that otherwise would corrode the aluminum pattern from its edge surface.

(5) Fifth Patterning (FIG. 5)

Forty (40) nm ITO films are deposited on the pixels to make pixel electrodes 51. A pad ITO film 52 is formed to cover the scanning line pads 11b, signal line pads 12, and power supply line pads 13. Further, small rectangular ITO films 53 and 54 are made to cover the contact holes 43 and 44 provided for the signal lines 31 and the contact holes 45 and 46 provided for the power supply lines 34a (see FIG. 1), respectively; and an ITO film 55 is made to cover the power supply terminals 34.

Meanwhile, the counter substrate 20 is made in the following processes. A metal layer made of chrome is deposited on the glass substrate and a metal light shielding layer is formed by applying a patterning process.

Next, a counter electrode layer made of ITO, etc., is formed at an area corresponding to the inside portion of sealant 61. An electric power supply terminal 21 for supplying an electric power to the second substrate (counter substrate) is also made in such place, size, and shape as those corresponding to the terminal 34.

The alignment layers are formed on the inner surfaces of the array and counter substrates 10 and 20 in the inside portion of a contacting region of the sealant 62, an electrically conductive material 61 is provided between the first power supply terminal 34 on the array substrate 10 and the second electric power supply terminal 21, and the sealant 62 fixes the array and counter substrates 10 and 20 so that a cell structure of the liquid crystal is assembled. The conductive material 61 in this embodiment is made by hardening an electrically conductive paste. Since both the conductive material 61 and sealant 62 are elastic, the pressure applied between the array and counter substrates 10 and 20 can be absorbed.

According to the present invention, the defects or inferior quality of the prior art liquid crystal display device caused by the breaking-down of the power supply lines 34a has been significantly reduced so that the production yield rate of a liquid crystal display device has been remarkably improved. Further, the invention does not substantially increase any costs of production process, manufacturing machines, or even material.

In this embodiment, the contact holes 47 and 48 are small, and stripe-like in cross-sectional shape, and provided side by side, but other modifications may be possible, e.g., parallel dispositions of circular or slit-like ones with a side length of the first terminal 34.

The present invention provides an improved liquid crystal display device which prevents the complete breaking-down of from breaking-down an electric power supply path supplying electric power from connecting pads on the circuit array substrate to a counter electrode on the counter substrate, so that quality can be significantly improved, Obviously, numerous modifications and variations of the present invention are possible in light of the above teaching. It is therefore to be understood that within the scope of the appended claims, the invention may be practiced otherwise than as specifically described therein.

What is claimed is:

1. A liquid crystal display device comprising:

a circuit array substrate;

a counter substrate provided opposite to said circuit array substrate;

a liquid crystal layer held between said circuit array and counter substrates; and sealant to seal the liquid crystal layer at a periphery of said circuit array and counter substrates, said circuit array substrate including,
pixel electrodes disposed in matrix on said circuit array substrate,
signal and scanning lines crossed substantially at right angles,
a connecting pad provided along at least one edge portion of said circuit array substrate,
a connecting portion connected to said connecting pad,
an electric power supply line,
a first electric power supply terminal extending from said power supply line,
a redundant electric power supply line extending from said connecting pad,
first contact holes, containing a first electrically conductive film connecting (i) said first power supply line to said connecting pad, and (ii) said first contact holes to each other,
second contact holes containing a second electrically conductive film connecting (i)said redundant electric power supply line to said first power supply terminal, and (ii) said second contact holes to each other, said counter substrate including,
a counter electrode provided opposite to regions of said pixel electrodes, and
a second electric power supply terminal provided on a part of said counter electrode, and
an inter-substrate electrically conductive material provided between said array and counter substrates and configured to electrically connect said second electrically conductive film to said second power supply terminal.

2. The liquid crystal display device in accordance with claim 1,
wherein one of said first contact holes exposes a part of said connecting pad;
wherein said redundant electric power supply line is connected to an electric power supply terminal base forming an extending portion of said redundant electric power supply line, and
wherein one of said second contact holes exposes a surface of said electric power supply terminal base while another of said second contact holes exposes said first electric power supply terminal.

3. The liquid crystal display device in accordance with claim 2,
wherein said first electric power supply terminal has a plurality of openings or cut-out portions within which said one of said second contact holes exposes said electric power supply terminal base.

4. A method of manufacturing a liquid crystal display device comprising:
forming, on a first substrate, a first pattern of scanning lines, gate electrodes connected to said scanning lines, scanning line pads, signal line pads and an electric power supply line pad, an electric power supply terminal base, and a redundant electric power supply line connecting said electric power supply terminal base to said electric power supply line pad;

forming a first insulation layer over said first pattern;

forming a second pattern of signal lines, drain electrodes connected to said signal lines, source electrodes, an electric power supply line, a first electric power supply terminal connected to said electric power supply line, and a plurality of openings or cut-out portions in said first electric power supply terminal;

forming a second insulation layer over said second pattern;

forming first contact holes (i) through said second insulation layer to expose a surface of said electric power supply line, and (ii) through said first and second insulation layers to expose a surface of said electric power supply line pad;

forming second contact holes (i) through said first and second insulation layers and within at least one of said openings or cut-out-portions to expose said electric power supply terminal base, and (ii) through said second insulation layer to expose said first electric power supply terminal;

forming a third pattern of pixel electrodes, a first electrically conductive film filling and coating said first contact holes to connect said electric power supply line pad to said electric power supply line, a second electrically conductive film filling and coating said second contact holes to connect said electric power supply terminal base to said first electric power supply terminal, and a third electrically conductive film to connect said signal line pads to said signal lines forming, on a second substrate, a counter electrode and a second electric power supply terminal connected to said counter electrode;

forming an inter-substrate electrically conductive material between said second electric power supply terminal and said second electrically conductive film; and providing sealant between said first and second substrates;

wherein said electric power supply terminal base is substantially consistent in contour with said first electric power supply terminal.

* * * * *